(12) United States Patent
Bruich et al.

(10) Patent No.: US 10,255,616 B2
(45) Date of Patent: Apr. 9, 2019

(54) SELECTING WHISPER CODES TO PRESENT WITH OFFERS

(75) Inventors: Sean Michael Bruich, Palo Alto, CA (US); Frederick Ross Leach, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/398,714

(22) Filed: Feb. 16, 2012

(65) Prior Publication Data

US 2013/0218666 A1  Aug. 22, 2013

(51) Int. Cl.
G06Q 30/00  (2012.01)
G06Q 10/10  (2012.01)
G06Q 30/02  (2012.01)

(52) U.S. Cl.
CPC ......... G06Q 30/0241 (2013.01); G06Q 10/10 (2013.01); G06Q 30/0207 (2013.01); G06Q 30/0211 (2013.01); G06Q 30/0235 (2013.01)

(58) Field of Classification Search
USPC .................................. 705/14.1, 14.13, 14.35
See application file for complete search history.

(56) References Cited

U.S. PATENT DOCUMENTS

| 8,280,766 B2 * | 10/2012 | Higgins et al. ............... 705/14.1 |
| 2007/0121843 A1 * | 5/2007 | Atazky et al. ............ 379/114.13 |
| 2009/0132366 A1 * | 5/2009 | Lam et al. ....................... 705/14 |
| 2010/0179856 A1 * | 7/2010 | Paretti et al. ................... 705/10 |
| 2011/0035278 A1 * | 2/2011 | Fordyce et al. ............ 705/14.49 |
| 2011/0145049 A1 * | 6/2011 | Hertel et al. .............. 705/14.23 |
| 2011/0153377 A1 * | 6/2011 | Novikov et al. ............. 705/7.11 |
| 2011/0302022 A1 * | 12/2011 | Fordyce et al. ........... 705/14.35 |

FOREIGN PATENT DOCUMENTS

WO  WO 2011139643 A1 * 11/2011 ............. G06Q 99/00

* cited by examiner

*Primary Examiner* — Kambiz Abdi
*Assistant Examiner* — Dipen M Patel
(74) *Attorney, Agent, or Firm* — Fenwick & West LLP (57) ABSTRACT

A social networking system captures performance metrics of an offer by selecting a whisper code to include in an offer when presenting the offer to users of the social networking system. The social networking system receives information for providing its users with an offer for redemption at a merchant establishment. The social networking system also receives a set of rules for selecting a whisper code to go with the offer. The rules may be based on any context for which the advertiser or merchant may want to track performance of the offer. When presenting the offer, the social networking system selects a whisper code using those rules. This tracking using different whisper codes enables the merchant to understand the performance of the offer campaign based on the context in which the social networking system presents the offers to its users.

29 Claims, 6 Drawing Sheets

SELECTING WHISPER CODES TO PRESENT WITH OFFERS

BACKGROUND

The present disclosure relates to distributing electronic offers using a social networking system, and in particular to selecting a whisper code to include with an offer when delivering the offer to users of the social networking system.

Brand-owners ("brands") and other merchants increasingly use digital media in marketing campaigns to attract and to retain customers. For example, using digital media, brands can deliver electronic coupons to consumers as website deals, e-mail loyalty programs, or any other type of electronic coupons. But consumers still make a large number of retail sales transactions offline.

In many cases, brands lack the ability to capture consumer online marketing activities that lead to offline purchases, referred to herein as in-store conversion. Campaigns developed with a limited understanding of in-store conversion for a particular consumer segment are less likely to benefit that consumer segment. And with limited actionable intelligence concerning in-store conversions, brands lack insight to assess whether modifications to a campaign may provide consumers or a consumer segment with more relevant and timelier offers.

SUMMARY

To enable tracking of the performance of an offer, a social networking system selects a whisper code to include with an offer when delivering the offer to users of the social networking system. The whisper code is then used by the users in connection with redeeming the offer, such as when the users make a corresponding purchase at a merchant establishment. The social networking system selects the whisper code for each viewing user (i.e., the user to whom the offer is presented) by applying a set of rules to a context in which the social networking system presents the offer to the viewing user. With the use of context-dependent whisper codes, enables measurement of the offer's performance in multiple dimensions using information maintained by the social networking system. Multi-dimensional offer performance provides actionable insights to enable the merchant to provide varying consumer segments with coupons and other offers that are more relevant and timely for each consumer or consumer segment.

In one embodiment, the social networking system receives from an advertiser, information for providing its users with an offer for redemption at a merchant establishment associated with the advertiser. The social networking system also receives a set of rules for selecting a whisper code to go with the offer. To enable measurement of the offer's performance across multiple social, temporal, and/or geographic dimensions, the social networking system selects a whisper code based on those rules when the system delivers an offer to one of its users.

In operation, the social networking system receives a request to provide the offer to a viewing user of the social networking system. In an embodiment, the social networking system then selects a whisper code from a list of codes to present with the offer to the viewing user. Alternatively or additionally, the social networking system may generate a whisper code when it receives a request to provide the offer, or otherwise generate a whisper code on-the-fly. The social networking system selects and/or generates the whisper code by applying a set of rules to a context in which the social networking system presents the offer to the viewing user. The rules may be based on any context for which the advertiser or merchant may want to track performance of the offer. For example, the context may represent a status that exists when the offer is presented, such as information from the user's profile, the user's activities or interactions with other users or objects in the social networking system, the user's social connections, a context in which the user saw the offer (e.g., in a targeted advertisement or in a story about one of the user's friends), or any other context for which the advertiser or merchant would want to track performance of the offer. In another example, the status may also represent temporal data independent of user status, such as a day of the week or time of day, or other dimensions, such as geographic data about a social networking system user, advertiser, or merchant.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of this disclosure for purposes of illustration only. One skilled in the art will readily recognize from the following discussion that alternative embodiments of the structures and methods illustrated herein may be employed without departing from the principles of the embodiments described herein.

DETAILED DESCRIPTION

Overview

To enable tracking of the performance of an offer, embodiments use social networking systems to select a whisper code to include in an offer when presenting the offer to a viewing user. To provide insight in to which offers may be relevant and timely to a variety of consumers, the social networking system may log performance of the offer across multiple social, temporal, and/or geographic dimensions.

For example, the social networking system may apply a set of rules to a context in which the social networking system presents the offer to the viewing user. Context may include, among other things, selecting different whisper codes based user demographics, depth of sharing, time when an offer was delivered, or other social information. And in some embodiments, the social networking system may change an attribute of an offer when presenting the offer based on a selected whisper code.

By selecting a whisper code based on a set of rules applied to a context when delivering an offer to one of its users, the social networking system measures performance of the offer in multiple dimensions. The resulting performance metrics may be analyzed to provide insights that enable merchants and advertisers to serve consumers or a consumer segment with more relevant and timelier offers. And in some embodiments, these metrics may be received by the social networking system for presentation to a merchant who redeemed the associated offer. Alternatively or additionally, these metrics may be provided to a third party for further analysis, or otherwise analyzed by the social networking system.

System Environment

Figure 1:
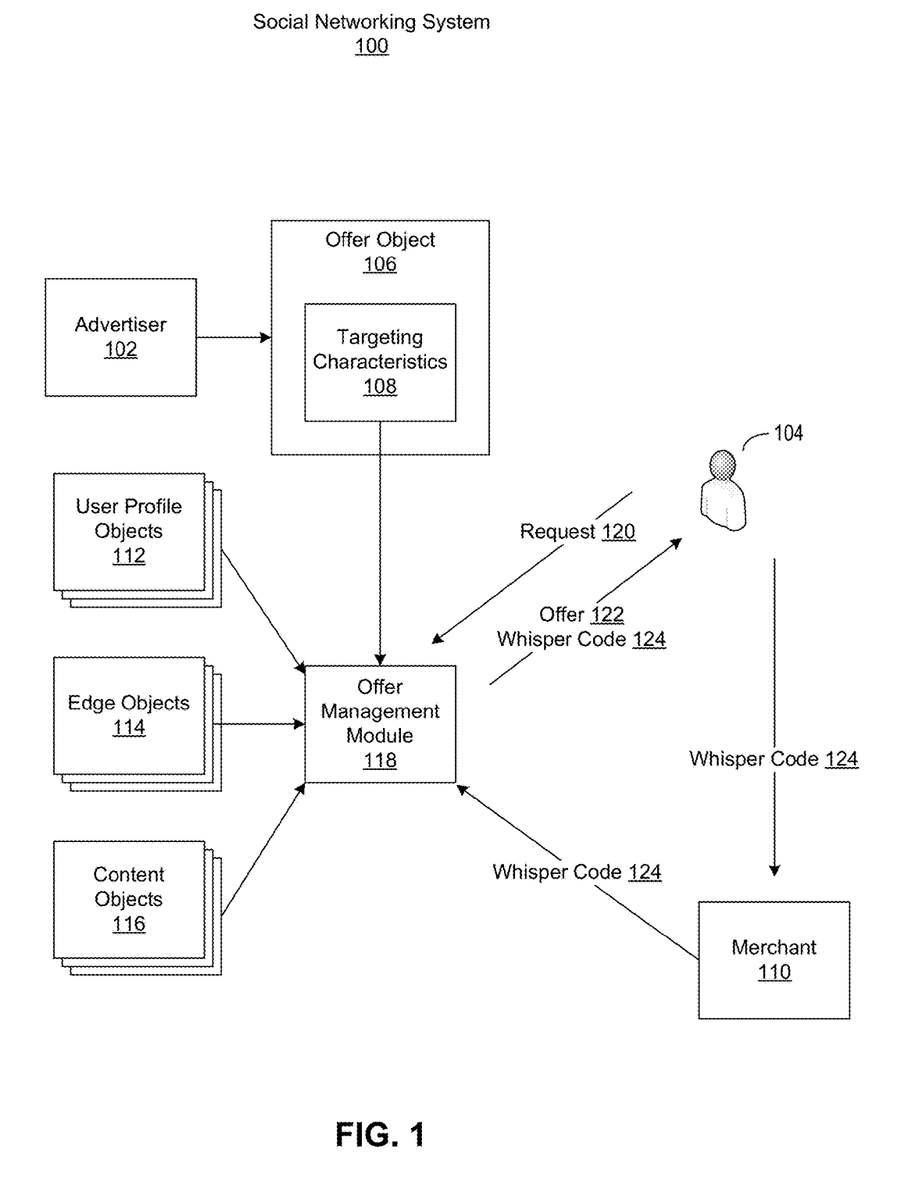
FIG. 1 illustrates a high level block diagram of an exemplary system for selecting a whisper code to include in an offer when presenting the offer to a user of the social networking system, in accordance with an embodiment.

FIG. 1 illustrates a high level block diagram of an exemplary system for selecting a whisper code to include in an offer when presenting the offer to a user 104 of the social networking system 100, in accordance with an embodiment. The exemplary system includes social networking system 100, advertiser 102 associated with merchant 110 and coupled to distribute offer 122, along with context-specific whisper code 124, to one or more users 104 using social networking system 100. The exemplary system may be organized in an alternative topology or configuration, and include different and/or additional modules.

Social networking system 100 offers its users the ability to communicate and interact with other users of the social networking system 100. Users join social networking system 100 and then add connections to a number of other users of social networking system 100 to whom they desire to be connected. As used herein, the term "friend" refers to any other user to whom a user has formed a connection, association, or relationship using social networking system 100. The term friend need not refer to nor require users of social networking system 100 to be actual friends. But instead, it simply implies a connection in social networking system 100. For example, one or more users 104 may be a friend of advertiser 102 or merchant 110, or user 104 may be a friend of another user of social networking system 100.

Users of social networking system 100 include entities, advertiser 102 and merchant 110, and one or more users 104. Advertiser 102 may be an entity, such as a brand-owner, third-party, or other entity engaged in commerce. Merchant 110 may be a physical establishment, such as a retail location, or an online, virtual, or similar entity without a physical establishment engaged in commerce. Advertiser 102 and merchant 110 may be associated with each other or otherwise act in concert to serve offer 122 and whisper code 124 to user 104. To serve offer 122 and whisper code 124, advertiser 102 and/or merchant 110 may interact with social networking system 100 to create and manage one or more pages in the social network to provide a forum for social networking users that have a common interest in the activities associated with advertiser 102 and/or merchant 110.

In some embodiments, advertiser 102 may create multiple pages on social networking system 100 to serve offer 122. A page may be created for various merchant locations or store fronts of merchant 110. For example, Starbucks may create and/or manage a page for each of the over 17,000 Starbucks retail stores worldwide. In another example, a brand-owner, such as Coca-Cola Company may create a page for products (e.g., Coca-Cola®, Diet Coke®, etc.) or product lines (e.g., soft drinks, energy drinks, and sports drinks). In other embodiment, advertiser 102 may be another entity or user acting as an administrator ("admin") to create and/or manage a page associated with a merchant establishment where offer 122 may be redeemed. For example, an admin may create a page and/or manage an advertiser page, including creating and posting offer 122 as a status update for distribution to other social networking users.

Figure 2:
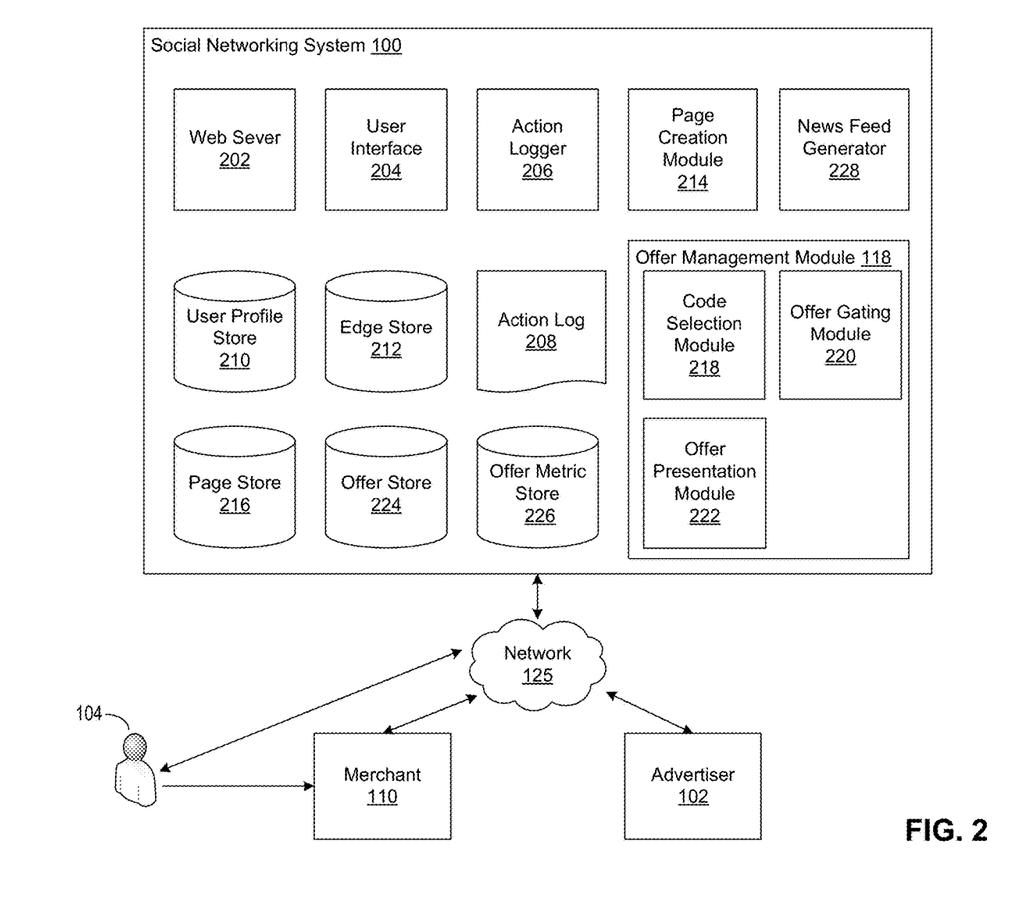
FIG. 2 illustrates a high level network diagram of a system for selecting a whisper code to include in an offer when presenting the offer to a user of the social networking system, in accordance with an embodiment.

Advertiser 102 and merchant 110 may be associated with one or more systems comprising one or more computing devices that can receive user input and can transmit and receive data via network 125 as further described in reference to FIG. 2. An exemplary computing device may include a conventional computer system executing a Microsoft Windows-compatible operating system (OS), Apple OS X, and/or a Linux distribution.

Non-entity users of social networking system 100 include one or more users 104. User 104 may be associated with one or more devices that comprise one or more computing devices. For example, a user computing device may be a computing device similar to or different from the computing devices described in reference to systems associated with advertiser 102 and merchant 110. In some embodiments, an exemplary user device may be a mobile computing device having computer functionality, such as a tablet computing device, electronic reader, personal digital assistant (PDA), mobile telephone, smart-phone, etc. An exemplary user device may be configured to execute an application, for example, a browser application that allows user 104 to receive offer 122 from social networking system 100, or otherwise interact with social networking system 100. An exemplary user device may be further configured to interact with social networking system 100 through an application programming interface (API) that runs on the native operating system of the user device, such as iOS and ANDROID™.

Social networking system 100 also maintains different types of objects representing these entities and users. Objects may include, but are not limited to, offer objects 106, user profile objects 112, edge objects 114, and content objects 116. Generally, an object may be stored for each instance of the associated entity.

Offer objects 106 store information representing offers or coupons offered by one or entities associated with advertiser 102 and/or merchant 110. Information represented be offer object 106 may include, for example, text description of the offer, discount level, redemption information, maximum number offers issuable to a user, options for a user to claim the offer, and maximum number of offers issuable based in part on which option to claim the offer is selected, terms and conditions, or one or more unique codes. Offer objects 106 may further include whisper codes 124, and targeting characteristics 108 specifying a set of rules to apply a context in which the social networking system selects whisper code 124 to present with the offer to the viewing user.

Whisper code 124 may be a unique code associated with an offer that when presented to merchant 110 enables user 104 to redeem the offer. Whisper code 124 may be a term, phrase, one or more letters, numbers, characters, or symbols suitable to uniquely identify offer 122. The social networking system selects whisper code 124 for each viewing user by applying a set of rules to a context in which social networking system 100 presents the offer to user 104. Whisper code 124 may be presented to merchant 110 visually or audibly. Whisper code 124 may be provided to social networking system 100 by advertiser 102 or merchant 110. Alternatively or additionally, whisper code 124 may be generated by social networking system 100, or a third party (e.g., marketing analytics service).

Targeting characteristics 108 may include rules applied to the context in which social networking system 100 selects whisper code 124 to present with the offer to a viewing user. Rules may include, for example, time associated with when an offer is presented, demographic information of a viewing user or advertiser 102 and/or merchant 110, geographic information associated with the viewing user or merchant 110, type of communication channel used to present the offer to a viewing user, and the type (e.g., direct versus word of mouth) and depth (i.e., degree of separation of viewing user from offeror) of offer distribution. A time associated with when an offer is presented may specify, for example, a day of the week, weekends, holiday, time of day, or any other time period. A demographic may specify, for example, gender, fans versus non-fans, age, personal relationship status, student versus non-student, occupation, or professional and/or personal affiliation. A type of communication channel may specify, for example, news feed, publish, organic, or share. Other rules characteristics 108 may include a location of an offer within the digital media presented to the user, depth of sharing of the offer, number of impression of the offer presented to a user, whether a user connected to a viewing user received an impression of the offer, whether a user connected to a viewing user redeemed the offer, or a device used (e.g., mobile device, tablet device, or desktop device) to view an impression of the offer or to redeem the offer.

User profile objects 112 include information describing a user of social networking system 100. Edge objects 114 include information about user interactions with other objects on social networking system 100, such as clicking on a link shared with the viewing user, sharing photos with other users of social networking system 100, posting a status update message on social networking system 100, and other actions that may be performed on social networking system 100. Content objects 116 include objects created by users of social networking system 100, status updates be associated with objects, photos tagged by users to be associated with other objects in social networking system 100, such as events, pages, and other users, and applications installed on social networking system 100.

FIG. 2 illustrates a high level network diagram of a system for selecting whisper code 124 to include in offer 122 when presenting offer 122 to user 104 of social networking system 100, in accordance with an embodiment. Social networking system 100 includes web server 202, user interface 204, action logger 206, action log 208, user profile store 210, edge store 212, page creation module 214, page store 216, offer management module 118, offer store 224, offer metric store 226, and news feed generator 228. In other embodiments, exemplary social networking system 100 may include additional, fewer, or different modules for various applications. Conventional components such as network interfaces, security functions, load balancers, failover servers, management and network operations consoles, and the like are not shown so as to not obscure the details of the system.

Web server 202 links social networking system 100 via network 125 to one or more users 104, advertiser 102, and merchant 110. Web server 202 serves web pages, as well as other web-related content, such as Java, Flash, XML, and so forth. Web server 202 may provide the functionality of receiving and routing communications between social networking system 100, user 104, advertiser 102, and merchant 110. Communication, for example, may include instant messages, queued messages (e.g., e-mail), text and SMS (short message service) messages, or messages exchanged using any other suitable messaging technique. Advertiser 102 may send a request to web server 202 via network 125 to upload information, such as, status updates, which may include offer 122 stored in offer store 224. Additionally, web server 202 may provide API functionality to send data directly to native user device operating systems, such as iOS, ANDROID™, webOS, and RIM®.

In one embodiment, network 125 uses standard communications technologies and/or protocols. Thus, network 125 can include wired and/or wireless links using technologies such as Ethernet, 802.11 family of standards, worldwide interoperability for microwave access (WiMAX), $3^{rd}$ Generation Partnership Project (3GPP) family of standards, CDMA, digital subscriber line (DSL), etc. Similarly, the networking protocols used on network 125 can include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). The data exchanged over network 125 can be represented using technologies and/or formats including the hypertext markup language (HTML) and the extensible markup language (XML). In addition, all or some of links can be encrypted using conventional encryption technologies, such as secure sockets layer (SSL), transport layer security (TLS), and Internet Protocol Security (IPsec).

Action logger 206 receives communications from web server 202 about user actions performed internal and/or external to social networking system 100. Action logger 206 populates action log 208 with information about user actions to log them. Such actions may include, for example, posting a status update, adding a connection to the other user, sending a message to the other user, checking-in to the same location that the other user checked-in to, tagging or commenting on an image that includes the other user, reading a message from the other user, sharing links with the other user, viewing content associated with the other user, and attending an event posted by the other user. In addition, a number of actions described in connection with other objects are directed at particular users, so these actions are associated with those users as well. Action logger 206 may also populate action log 208 with information about user's interaction with offer object 106. Interactions with offer object 106 may include viewing the offer, clicking on an image or link to claim the offer, sharing the offer, commenting on the offer, or redeeming the offer.

Action logger 206 may also populate action log 208 with metadata associated with user actions. Metadata may include, for example, temporal data associated with when an action was performed or when an action is intended to be performed, and geographic data associated with the location of where an action was performed or where an action is intended to be performed. Action log 208 logs data about users of social networking system 100, including viewing histories, advertisements that were clicked on, offers viewed, purchasing activity, and buying patterns. Similar data recorded for each user of social networking system 100 may be provided to code selection module 218 and offer gating module 220 to select whisper code 124, and to present offer 122 with whisper code 124 to user 104 based on rules applied to the user's interactions (i.e., context) with social networking system 100 and/or external websites associated with advertiser 102 and/or merchant 110.

User account information and other related information for users may be stored as user profile objects 112 in user profile store 210. The user profile information stored in user profile store 210 describes the users of social networking system 100, including biographic, demographic, and other types of descriptive information, such as work experience, educational history, gender, hobbies or preferences, location, and the like. User profile store 210 may also store other information provided by the user, for example, images or videos. In certain embodiments, images of users may be tagged with identification information of users of social networking system 100 displayed in an image. User profile store 210 also maintains references to the actions stored in action log 208 and performed on objects in offer store 224. Information stored in user profile store 210 may be associated with rules associated with demographic information. For example, social networking system 100 may select whisper code 124 to present with offer 122 to log performance of an offer based on gender, age, or hometown associated with a user at a time when offer 122 is presented to the user.

Edge store 212 stores the information describing connections between users and other objects on social networking system 100 in edge objects 114. Some edges may be defined by users, allowing users to specify their relationships with other users. For example, users may generate edges with other users that parallel the users' real-life relationships, such as friends, co-workers, partners, and so forth. Other edges may be generated when users interact with objects in social networking system 100, such as expressing interest in a page on social networking system 100, sharing a link with other users of social networking system 100, and commenting on posts made by other users of social networking system 100. Information stored in edge store 212 may be associated with a set of rules applied to user connections and/or user interactions with social networking system 100 for selecting whisper code 124. For example, social networking system 100 may select whisper code 124 to present with offer 122 to log performance of offer 122 based on degree of separation of a user from a page associated with advertiser 102, when offer 122 was redeemed using whisper code 124, offers 122 redeemed by fans versus non-fans of advertiser 102, the depth offer 122 was shared by connected users, or more generally, affinity for an object, interests, entity, or other user.

Edge store 212 may also store data about connections between pages associated with advertiser 102 and/or merchant 110. For example, edge store 212 may store information describing the relationship between a parent page for Starbucks and the thousands of child pages for individual Starbucks retail locations. Edge store 212 stores edge objects that include information about the edge, such as affinity scores for objects, interests, and other users. Affinity scores may be computed by social networking system 100 over time to approximate a user's affinity for an object, interest, and other users in social networking system 100 based on the actions performed by the user. Multiple interactions between a user and a specific object may be stored in one edge object in edge store 212, in one embodiment. For example, a user that plays multiple songs from Miles Davis' album, "Kind of Blue," may have multiple edge objects for the songs, but only one edge object for Miles Davis.

In one embodiment, the user device/component/software notifies users of the types of information that are stored in the respective stores and logs and transmitted to the advertiser 102 and/or merchant 110, and provides the user the opportunity to opt-out of having such information collected and/or shared with the advertiser 102 and/or merchant 110.

Page creation module 214 may be used to create a new page in the social network. The request to create a new page may be received from a user (or an admin). The request may be activated by a user's check-in to a particular location or business (e.g., retail location associated with advertiser 102 and/or merchant 110). A new page request may also be activated when a user clicks on a "create a new page" link or similar type of link in the social networking environment. Page creation module 214 can respond to the user and instruct the user to submit additional information about the topic of interest, such as a name, a category, a sub-category, a photo, a website, a location or an address, etc.

In some embodiments, to create an offer for distribution to users of social networking system 100, a user clicks on a "create coupon" link or tab within the "create a new page" process. Page creation module 214 may respond to the user's request to create a coupon by instructing the user to submit information about the coupon including, retail locations for redeeming the offer, and links for the user to select an option to claim the offer as previously described. Page creation module 214 may submit information about the new page and associated offer 122 for storage in page store 216, and pass the data along to offer management module 118 for processing.

Offer management module 118 selects a whisper code from a plurality of whisper codes and distributes offers including the selected whisper code using one or more communication channels associated with social networking system 100. Communication channels may include, for example, a news feed, wall/page post, e-mail, text message, instant message, etc. Offer management module 118 may include, among other components, code selection module 218, offer gating module 220, and offer presentation module 222.

Offer management module 118 receives pages associated with advertiser 102 and/or merchant 110 and stored in page store 216, and processes the received pages to identify information about offers included in the pages. Pages that include offers may be identified by a flag set when the "create coupon" link is activated, or by other methods known by those of ordinary skill in the art. In other embodiments, offer management module 118 may receive information about offers not generated by using the "create coupon" link, but instead, submitted to social networking system 100 in a predetermined format. For example, in an embodiment, user interface 204 includes an interface for submitting offers for distribution to users of social networking system 100. The interface may prompt the user to input information describing the offer as previously described. Identified offers may be stored in offer store 224. Offer store 224 may also store information (e.g., user demographics) on offers presented and claimed by users.

Figure 4:
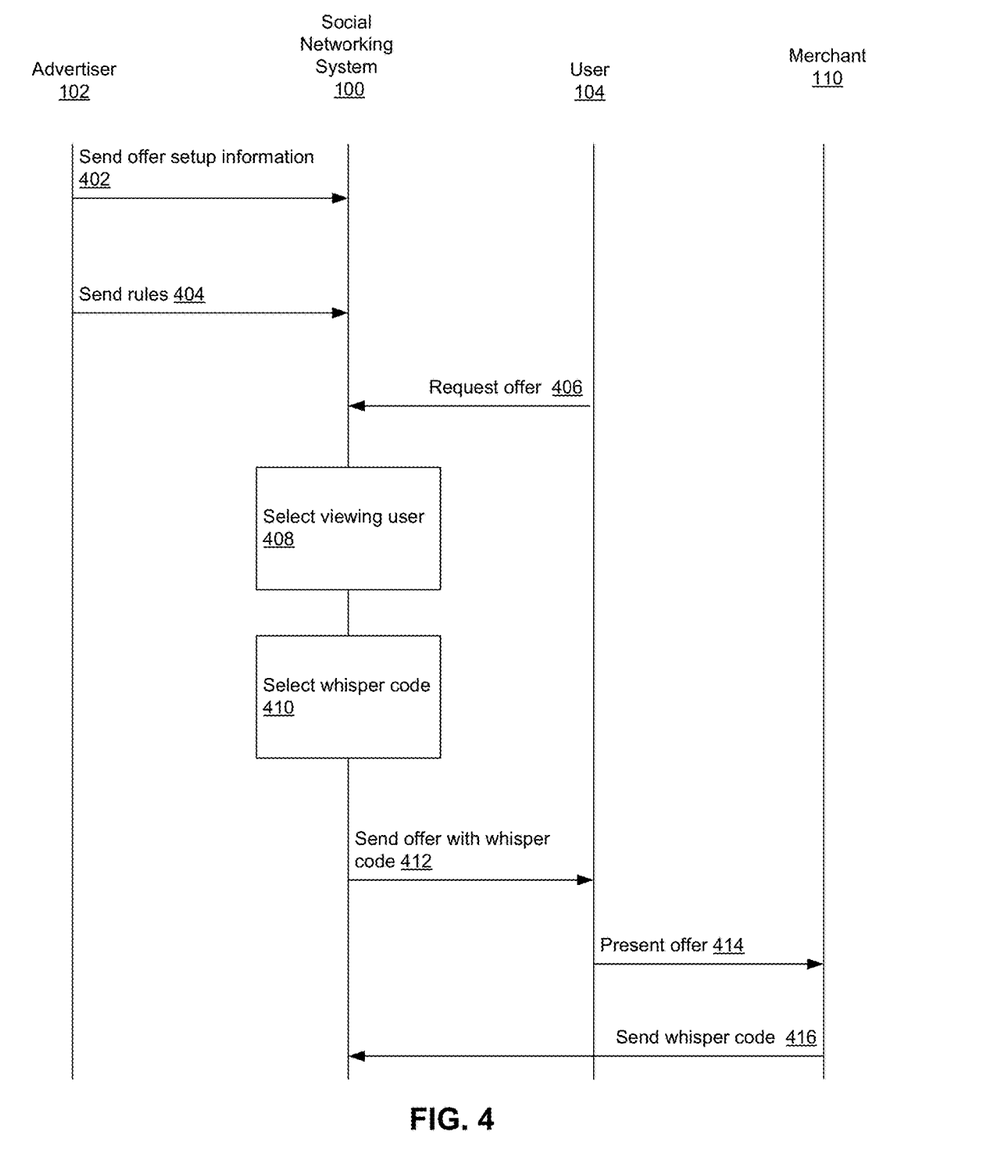
FIG. 4 illustrates an event trace diagram for selecting a whisper code to include in an offer when presenting the offer to a user of the social networking system, in accordance with an embodiment.
Figure 5:
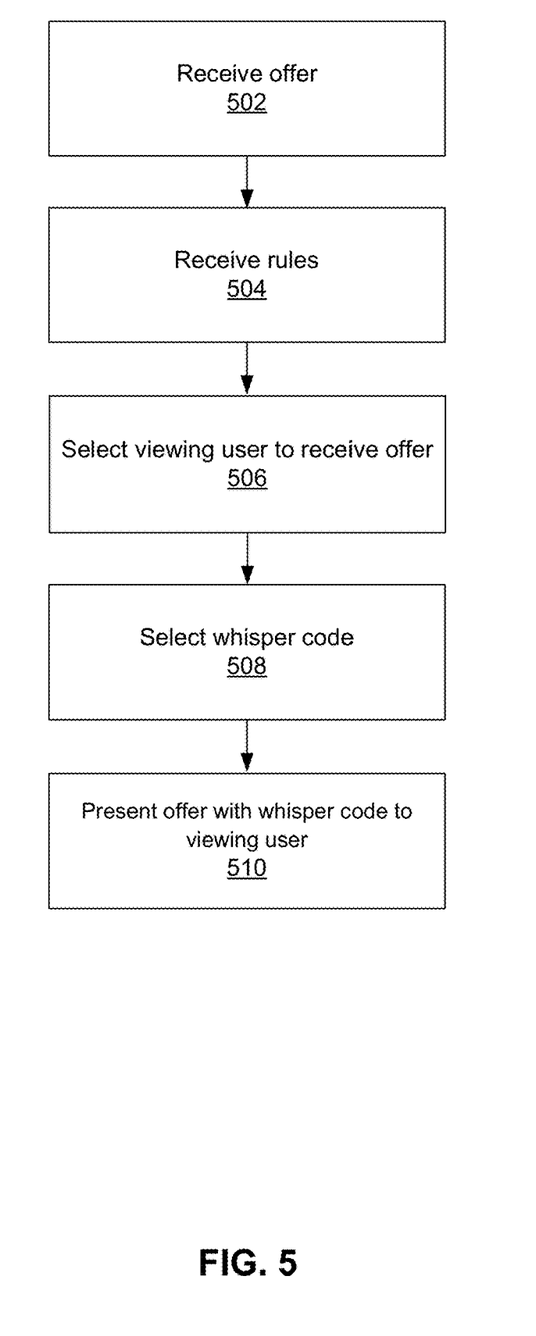
FIG. 5 illustrates a flowchart for selecting a whisper code to include in an offer when presenting the offer to a user of the social networking system, in accordance with an embodiment.

Code selection module 218 selects one or more whisper codes 124 by applying a set of rules to a context in which the viewing user is to be provided offer 122 as will be further described in reference to FIGS. 4 and 5. Offer gating module 220 may limit which users receive offers from social networking system 100 based on geographic proximity to one or more retail locations associated with a merchant 110 or other location where the offer may be redeemed. For example, offer gating module 220 may limit the distribution of an offer for "15% off a dinner for two at the Slanted Door restaurant in San Francisco, Calif." to users located within forty miles the Slanted Door restaurant in San Francisco. In an embodiment, offer gating module 220 may determine a user's location based on user information stored in user profile (e.g., current city or hometown). In another embodiment, offer gating module may determine a user's location based on geo-location information stored in action log 208 (e.g., check-in location information). Offer gating module 220 may further limit which users receive offers based on other criteria, such as an indication of interest in the object of offer 122 based on previous interactions with users of social networking system 100 stored in action log 208. For example, offer gating module 220 may limit distribution of offer 122 based at least in part on an affinity for the provider or an affinity for the subject matter of offer 122.

Offer presentation module 222 presents offers and selected whisper codes to users of social networking system 100. Offer presentation module 222 may present offer 122 using one or more communication channels associated with social networking system 100 as previously described. In an embodiment, offer presentation module 222 presents offers with selected whisper codes using news feed generator 228 to increase the virality by which offers tagged with a particular whisper code may be distributed. To distribute the offers with the whisper codes, news feed generator 228 generates news feed stories including the offer and whisper code for presentation to users of social networking system 100.

In operation, to generate a news feed story, news feed generator 228 analyzes information stored in action log 208 to identify information useful for generating news feed stories. News feed generator 228 identifies actions stored in action log 208 that are likely to be of interest to viewers and extracts information describing these action from action log 208 to generate news feed stories. For example, user actions, such as claiming an offer directly from a coupon story may be captured and stored in action log 208, and extracted by news feed generator 228 for presentation to users connected to user 104. News feed generator 228 may repeat this action each time a user of social networking system 100 claims an offer from a coupon story included in the user's news feed or redeems and offer at a merchant location using a whisper code presented with the offer.

Alternatively, news feed generator 228 may obtain information describing action from other modules, such as from action logger 206 or other run time modules that implement functionality for performing different types of actions. For example, if a user uploads an image to social networking system 100, the module executing the code for uploading the image can inform news feed generator 228 of the action so that news feed generator 228 can generate a news feed story describing the action.

News feed generator 228 may determine that certain actions are not likely to be of interest to users for reporting as news feed stories. For example, a user hiding a comment posted by another user or a user changing certain types of user preferences may not be of interest to other users and is therefore not reported in news feed stories. However, other changes made by a user to the user's profile may be considered interesting for other users, for example, a change in relationship status of a user.

News feed generator 228 may not generate news feed stories based on certain actions as a matter of policies enforced by social networking system 100. For example, a user viewing a user profile of another user or a user sending a private message to another user may not be presented as news feed stories due to privacy concerns. Furthermore, news feed generator 228 may consider privacy settings of individual users to determine whether certain actions of a user can be presented as news feed stories to other users. A user may set the user's privacy settings to limit the set of people to whom news feed stories describing the user's actions may be sent. For example, a user may allow only connections of the user to receive information describing the users' actions, whereas another user may allow connections of the user's connections to receive the information. A user may restrict the types of actions that are reported as news feed stories. For example, the user may specify that certain actions, for example, adding a new connection may not be reported as news feed stories.

Figure 3:
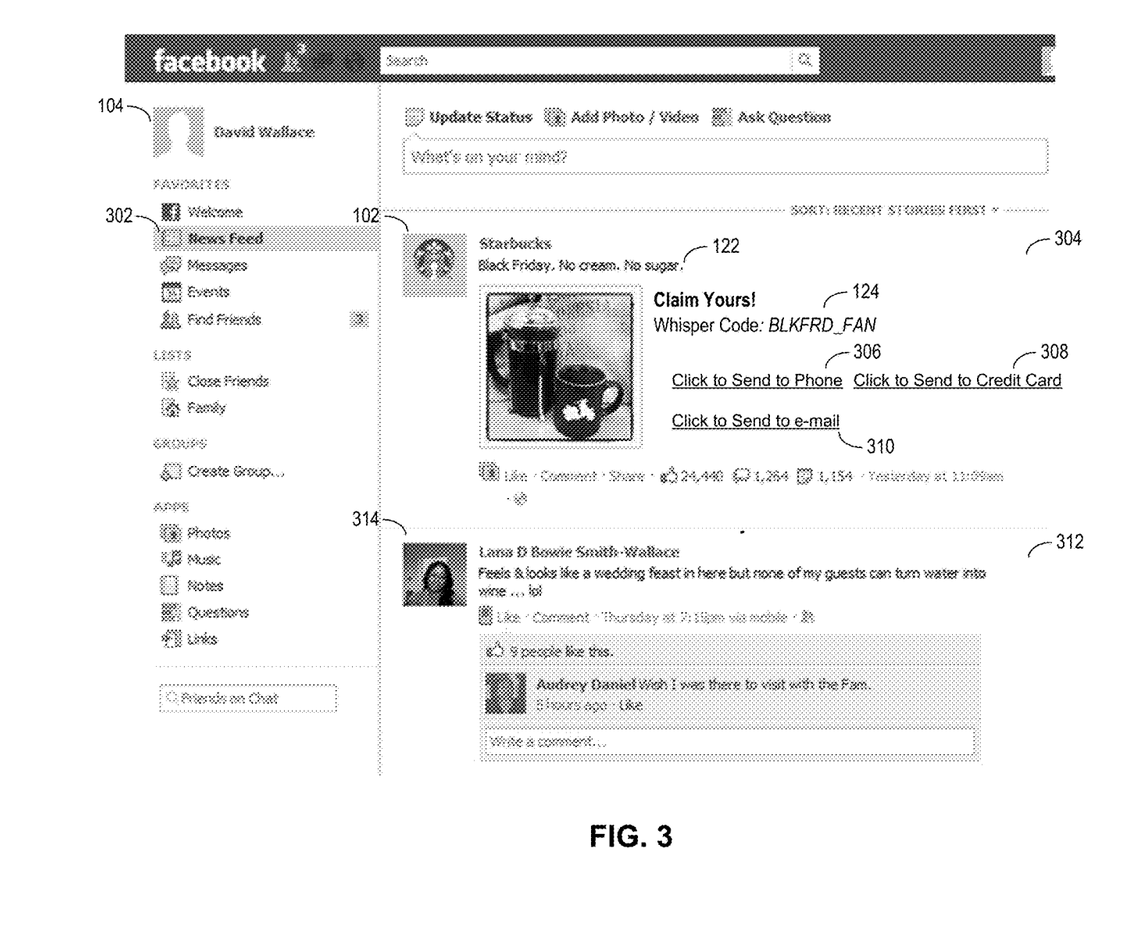
FIG. 3 illustrates a screenshot of a user interface displaying an exemplary offer, in accordance with an embodiment.

FIG. 3 illustrates a screenshot of a user interface displaying an exemplary user news feed 302 presented to user 104, in accordance with an embodiment. As shown in FIG. 3, user news feed 302 of the viewing user's friends' actions includes one or more news feed stories 304 and 312 presented to user 104. In some embodiments, a news feed 302 may be a wall/profile page having stories about a particular entity in social networking system 100. Typically, news feed stories presented to the user are updated as and when news feed stories are generated. News feed stories may be generated when connections of the user perform actions. These actions may include, without limitation, posting an image, commenting on a status update or posted image, sharing a link from a page external to social networking system 100, listening to a song from a music service external to social networking system 100, and a connection of the user adding a new connection.

News feed stories may also be associated with entities represented in social networking system 100. Activities of these entities may include posting an offer for merchandise and/or services at reduced cost for distribution to multiple users connected to the entity or users who have otherwise expressed interest in the entity. For example, a connection, such as advertiser 102 or merchant 110, may post a status update that includes an offer (e.g., a coupon) for redemption at a retail location associated with the advertiser 102 and/or merchant 110. Activities of these entities may also include a connection (e.g., an advertiser or merchant) posting a status update that includes an offer (e.g., a coupon) for redemption at a merchant location associated with the advertiser, or a connection posting a status update that includes information about a Valentine's day concert. In another example, activities further include a connection, such as a non-profit organization, posting a status update that includes a request to donate to provide clean water for rural communities in Africa.

Advertiser 102 may be associated with an advertising user of social networking system 100 connected to user 104. User news feed 302 includes news story 304 generated from activities of advertiser 102 and news story 312 generated from activities of connected user 314. In an embodiment, news feed story 304 is a coupon story generated when an advertising user associated with advertiser 102 creates a page post that includes an offer or coupon 122 for display to users connected to the advertising user. Offer 122 may include a text description and whisper code 124. The text description includes information describing the offer including the offer title or name (e.g., Holiday latte), terms and conditions for redeeming to the offer, merchant locations for redeeming the offer, an image of the offer, and a link to access additional information about the offer.

Portions of the text description may be displayed prior to a user selecting an option to claim the offer, while other portions of the text description may be displayed after a user selects an option to claim the offer. For example, the text description may display various discount levels tied to one or more options to claim offer 122 when user 104 mouses-over one of the displayed options 306, 308, and 310. In another example, the text description may display different discount choices or levels when a user mouses over the options in the news feed story or when the user clicks one of the options to claim the offer. In the first instance, the displayed discount level is tied to how the offer is shared (e.g., depth of sharing the offer, who shared the offer, and who recommended the offer). These factors, in turn, may be used by social networking system 100 to help indicate ad conversion tracking. In the second instance, the text description may display various discount levels when user 104 clicks one of the displayed options 306, 308, and 310 to claim offer 122. For example, the text description may display a 10% discount when user 104 selects "Click to Send to e-mail" 306, 20% discount when user 104 selects "Click to Send to Phone" 308, and a 30% discount when user 104 selects "Click to Send to Credit Card" 310.

In an embodiment, the discount level displayed according to which option for claiming the offer is selected may be based at least in part on an authenticity score determined by social networking system 100. Social networking system 100 may assign a higher authenticity score to a method for claiming the offer that is more closely tied to a uniquely identifiable user. For example, using the method "Click to Send to Credit Card" 310, receives a high authenticity score because a credit card is commonly associated with a user's social security number or similar type of unique identifier. And, by redeeming the offer with a credit card, the user's identity is typically confirmed by the merchant when the offer is redeemed. Using the method "Click to Send to Phone" 308, receives a lower authenticity score relative to using the method "Click to Send to Credit Card" 310. In this case, although a phone number may be unique to a user, it may more difficult for a merchant to confirm that a person presenting the mobile device to the merchant for redeeming the offer is in fact the user that claimed the option to redeem the offer. Using the "Click to Send to e-mail," receives the lowest authenticity score of the three methods because, of the three methods, an e-mail address is more loosely tied to a uniquely identifiable user. In fact, in some case an e-mail address is associated with a non-person entity, including corporations, non-profit organizations, or other social organization, rather than a unique user.

In other embodiments, users having a credit card registered with social networking system 100 may receive a high authenticity score compared to users of social networking system 100 that do not have a registered credit card. Similarly, users registered with the merchant's rewards program may be viewed as more authentic compared to users not registered. And, existing customers of merchant 110 may also be viewed as more authentic compared to prospective customers.

Selecting a Whisper Code to Present with an Offer

FIG. 4 illustrates an event trace diagram for selecting whisper code 124 to include in offer 122 when presenting offer 122 to user 104 of social networking system 100, in accordance with an embodiment. The event trace in FIG. 4 describes the interaction between advertiser 102, social networking system 100, user 104 (e.g., a viewing user), and merchant 110 associated with a merchant location where the offer may be redeemed.

Advertiser 102 sends 402 offer setup information to social networking system 100. To setup the offer, advertiser 102 or a third-party associated with advertiser 102 creates an offer associated with a page in the social network or submits an offer to social networking system 100 in a predetermined format using user interface 204. In the setup information, advertiser 102 or a third-party may include for example, a text description of the offer, redemption information, expiration date, unique offer code, maximum number offers issuable to a user, options to claim the offer, and maximum number of offers issuable based in part on which option to claim the offer is selected. Alternatively or additional, offer setup information may also include one or more whisper codes 124 associated with the promotional campaign to be presented along with the offers.

In an embodiment, advertiser 102 sends 404 a set of rules used by social networking system 100 to select a whisper code to present with the offer by applying the rules to a context in which the viewing user is to be provided the offer. For example, a rule may specify using code A if a first condition exists, otherwise use code B. The condition may relate to a social context such as, time of day or day of week; whether some characteristic from the user's profile is equal to something (e.g., the user is male, or lives in San Francisco); whether the user viewed the coupon in a news feed story about his friend's redemption of the coupon, or whether it was presented as a paid-for advertisement; or any other context for which the advertiser/merchant would want to track conversion rates or other performance metrics associated with an offer.

In another embodiment, advertiser 102 sends 404 a set of rules and/or targeting characteristics to social networking system 100 from which social networking system 100 creates and/or applies the set of rules to select 410 whisper code 124. For example, social networking system 100 may organize the targeting criteria and whisper codes 124 in a lookup table located in offer store 224. Code selection module 218 may map targeting characteristics to rules for selecting whisper codes 124 by grouping the received targeting characteristic as being related to demographics, temporal, geographic, connection type, device type, entity, or other category, and associating groups of whisper codes with each category. Alternatively, code selection module 218 may apply rules to randomly map whisper codes with each targeting characteristic and store the mapping in a lookup table, or other method suitable to map whisper codes 124 to targeting criteria.

Social networking system 100 receives 406 a request to provide the offer to a viewing user of social networking system 100. In an embodiment, the request may be received from a web page where the offer is to be placed. For example, the request may be received directly a web page associated with the merchant (e.g., on-line retailer) offering the offer to the viewing user. In another embodiment, the request may be received from a web page responsive to receiving a request to provide the offer to the viewing user. For example, the request may be an explicit request from a user (e.g., user 104 claiming and offer from a news story or page/wall post) as shown in FIG. 4. For example, the viewing user may receive offer 122 as a coupon story included in a feed of a plurality of stories on a user device. The user device may be desktop computing device, such as a personal computer or laptop computer, or similar computing device suitable to interface with social networking system 100 and to interact with the coupon story as previously described.

In an embodiment, the viewing user sends a selection for an option to claim the offer using a user device to social networking system 100. For example, the viewing user may click on one of the following options included in a coupon story to claim offer 122: (1) "Click to Send to Phone"; (2) "Click to Send to e-mail"; or (3) "Click to Send to Credit Card." In another embodiment, the viewing user by selecting "Click to Send to Phone" elects to send offer 122 to a device different from the device used to select the option to claim offer 122. In other embodiments, the viewing user elects to send offer 122 to the same device used to select the option to claim offer 122.

In an embodiment, social networking system 100 receives a request from a user to opt-in to receiving an offer prior to or substantially contemporaneously with receiving a request for an offer. In another embodiment, the request results from merely serving a page to user 104 where the offer is to be placed.

To serve the request, social networking system 100 selects 408 a viewing user to receive the offer responsive to receiving a request for the offer as described. Social networking system 100 then selects 410 whisper code 124 to be presented with offer 122 to user 104. In an embodiment, code selection module 218 selects whisper code 124 from the plurality of whisper codes to present with offer 122 to the viewing user based on applying the set of rules to a context in which the viewing user is to be provided offer 122 as previously described. To determine context, code selection module 218 may interact with other modules, stores, and logs within social networking system 100. For example, rules may be applied to log the performance of offer 122 redeemed by user 104 who discovered offer 122 after offer 122 was shared by another connected user being at least four levels removed from user 104. In this case, code selection module 218 may interact with action log 208 and edge store 212 to determine that user 104 requested the offer after receiving a recommendation from a friend, who received offer 122 as a coupon story from another friend who claimed offer 122 from a coupon story from another friend who is a fan of advertiser 102 who posted offer 122 on a page in the social network. In another example, rules may be applied to log the performance of offer 122 redeemed by user 104 after at least one week from when user 104 received a first impression of offer 122. In this case, code selection module 218 may interact with action log 208 and edge store 212 to determine when user 104 received a first impression of offer 122 and when social networking system 100 received a selected whisper code 124 presented with offer 122 from merchant 110 after user 104 redeemed offer 122 at a merchant location.

Social networking system 100 sends 412 offer 122 and whisper code 124 to user 104. In an embodiment, social networking system 100 also sends 412 information for redeeming offer 122 to user 104 for presentation to merchant 110. Information for redeeming offer 122 may include offer 122 represented as an image, instructions for redeeming the offer, and whisper code 124. In another embodiment, social networking system 100 sends to user 104 whisper code 124 separately from offer 122. To redeem offer 122, user 108 presents 414 offer 122 and whisper code 124 at the point of sale at the merchant location. Offer 122 and whisper code 124 may be presented in any manner suitable to be perceived and processed at the point of sale at the merchant location. For example, offer 122 may be presented as an image displayed on a mobile phone. The image may be an encoded image, such as a bar code, quick response (QR) code, or other image suitable to be captured and processed by point of sale equipment at the merchant location. Whisper code 124 may also be presented as an image in a similar manner to offer 122, or may be presented audibly to a cashier or the like at the merchant location, who may then input whisper code 124 at the point of sale.

In an embodiment, social networking system 100 sends information for redeeming the offer to credit card system and a merchant location associated with merchant 110. In another embodiment, social networking system 100 sends the credit card information in an encrypted format achieved by using a hash function or other encryption method suitable to protect the credit card information from detection during transmission to the credit card system and/or the merchant location. The credit card information may be decrypted at the point of sale terminal at the merchant location, and matched with the viewing user's credit card when the viewing user redeems offer 122 at the merchant location. In this case, to redeem the offer, user 104 may present 414 whisper code 124 at the merchant location to redeem offer 122. By doing so, the discount value associated with offer 122 may be applied automatically during the transaction.

Figure 6A:
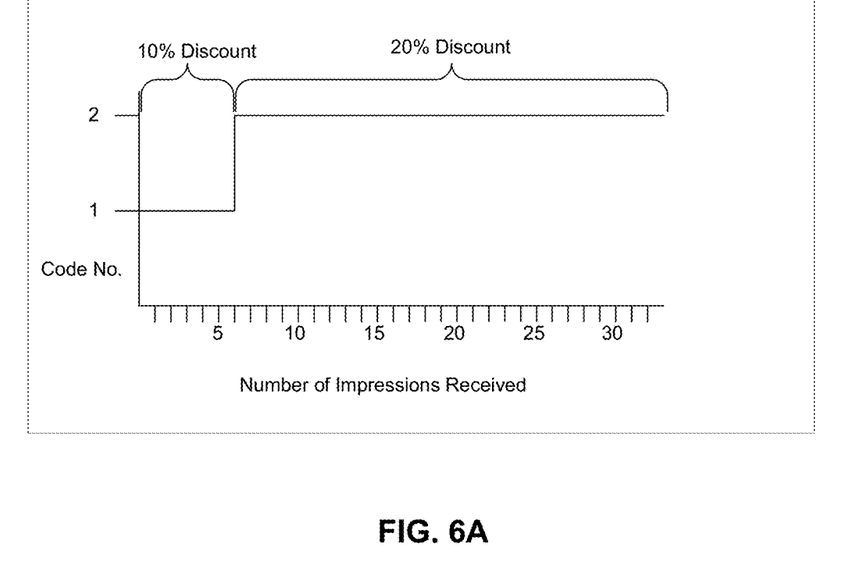
FIG. 6A illustrates an exemplary metrics user interface, in accordance with an embodiment.
Figure 6B:
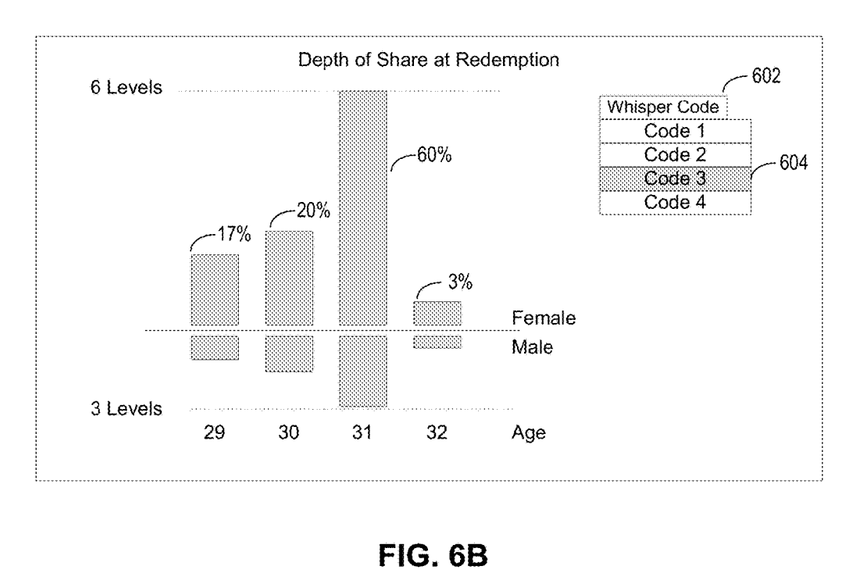
FIG. 6B illustrates another exemplary metrics user interface, in accordance with an embodiment.

In an embodiment, after offer 122 is redeemed, merchant 110 sends 416 whisper code 124, along with associated transaction information to social networking system 100. Received by social networking system 100, the information may then be presented to a third party for further analysis, analyzed by social networking system 100, or used by social networking system 100 to select whisper codes based on a set of rules and/or associate whisper codes with targeting criteria as previously described. An exemplary user interface for analyzing such data is further described in reference to FIG. 6. With insights obtained by analyzing these metrics, social networking system 100 may present offers perceived as more relevant and timely to consumers.

FIG. 5 illustrates a flowchart for selecting whisper code 124 to include in offer 122 presented to a user of social networking system 100, in accordance with an embodiment. Social networking system 100 receives 502 offer 122 from advertiser 102, merchant 110, or a third-party associated with advertiser 102 or merchant 110. In an embodiment, offer 122 may be provided as a page in the social network or as an offer provided to social networking system 100 in a predetermined format using user interface 204. Social networking system 100 may receive 504 rules for selecting whisper code 124 to present with offer 122 to user 104 as previously described, for example, in reference to FIG. 4.

Social networking system 100 selects 506 a viewing user to receive the offer responsive to receiving a request to receive and/or claim an option to redeem the offer from a viewing user. In some embodiments, the request may be an explicit request from a user (e.g., user 104 claiming and offer from a news story or page/wall post). For example, the viewing user may receive offer 122 as a coupon story included in a feed of a plurality of stories on a user device. The viewing user may then send a selection for an option to claim offer 122 to social networking system 100. To select an option, the viewing user may click on one of the following options included in a coupon story to claim offer 122: (1) "Click to Send to Phone"; (2) "Click to Send to e-mail"; or (3) "Click to Send to Credit Card."

Social networking system 100 then selects 508 whisper code 124 from a plurality of whisper codes to be presented with offer 122 to user 104. In some embodiments, code selection module 218 may select a whisper code from the plurality of whisper codes to present with offer 122 to the viewing user based on applying the set of rules to a context in which the viewing user is to be provided the offer. Rules, for example, may specify temporal, demographic, geographic, or social information associate with the user at the time the offer is presented to the user. For example, social information and/or data may specify whether the viewing user's friends have seen or redeemed the offer. Social data may also specify the type or depth (i.e., depth of share) of offer distribution when the offer is presented.

Social networking system 100 presents 510 offer 122 and whisper code 124 to user 104. In presenting offer 122 and whisper code 124, social networking system 100 may also send information for redeeming offer 122 to user 104 for presentation to merchant 110. In other embodiments, social networking system 100 may send whisper code 124 separately from offer 122. In another embodiment, social networking system 100 sends information for redeeming the offer to credit card system and a merchant location associated with merchant 110. In some embodiments, social networking system 100 may send the credit card information in an encrypted format to protect the credit card information from detection during transmission to the credit card system and/or the merchant location. The credit card information may be later decrypted at the point of sale terminal at the merchant location, and matched with the viewing user's credit card when the viewing user redeems offer 122 at the merchant location.

In an embodiment, social networking system 100 may also select or change offer 122 based on the selected whisper code 124. For example, and as shown in FIG. 6A, social networking system 100 changes the discount level of an offer based on the selected whisper code. FIG. 6A illustrates an exemplary metrics user interface, in accordance with an embodiment. To log performance concerning how long different users take to redeem an offer, social networking system 100 may select a first whisper code to be presented with an offer to users who at the time the offer is presented have received zero to five impressions of the offer, and select a second whisper code to be presented with an offer to users who at the time the offer is presented have received six to ten impressions of the offer. The stated discount level included in offers presented with the first whisper code may provide 10% discount level. But, to encourage users who received six to ten impression of the offer to redeem the offer, offers presented with the second whisper code may provide a 20% discount level. In this embodiment, secondary or supplemental rules separate from the previously discussed rules may be applied to a context to determine how an offer may be modified based on the selected whisper code.

FIG. 6B illustrates another exemplary metrics user interface, in accordance with an embodiment. For example, exemplary metrics user interface enables advertiser 102 and/or merchant 110 to analyze metrics logged by using context-aware whisper codes. In an embodiment, social networking system 100 logs metrics based on a whisper code selected and presented with an offer, and aggregates the logged metrics for further analysis. And in some cases, social networking system 100 receives from a merchant establishment information regarding one or more redemptions of the offer, which includes the selected whisper code presented with the offered. Social networking system 100 also logs the redemption information received from the merchant establishment for analysis as will now be described.

In an embodiment, in analyzing the logged metrics, the social network system computes metrics for a particular consumer segment (e.g., demographic data), geographic region, merchant establishment, product campaign, or time period. The metrics may include, for example, in-store conversion rate, average time to redemption, rate of redemption compared to number of impressions, rate of redemption based on number of impressions received by other social networking users connected to the viewing user, and rate of redemption based on depth of share. Metrics may also include social metric data, such as how many users converted the offer who also had friends that converted the offer and/or were shown the offer. Social networking system 100 may aggregate the metrics based on transaction characteristic, a combination of transaction characteristics, or other categories determined by social networking system 100, advertiser 102, merchant 110, or a third party associated with advertiser 102 and/or merchant 110.

The metrics user interface includes drop-down selection menu 602 for selecting one or more metrics associated with one or more whisper codes. For example, as shown in FIG. 6B, whisper code 3 604 is selected and corresponds to depth of share at redemption for an equal sample size of males and females. Here, the metrics user interface displays depth of share at redemption for females and males ages twenty-nine through and including thirty-two. As shown in FIG. 6B, for the sample group of females, females age thirty-one redeemed offers at a greater depth of share than females age twenty-nine through thirty-two. The same was true for males age thirty-one, but by a smaller percentage relative to females age thirty-one. Using this data, social networking system 100 may indicate to advertiser 102 and/or merchant 110 that females and males age thirty-one may be more likely to redeem offers recommended and/or redeemed by several friends. The metrics user interface represents an exemplary interface, in that any metric associated with one or more whisper codes 124 may displayed in similar or different manner suitable for analysis.

SUMMARY

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   receiving from an advertiser at a social networking system an offer for redemption at a merchant establishment associated with the advertiser;
   receiving a set of rules for selecting a whisper code from a plurality of whisper codes to be presented with the offer, the rules determining the whisper code to be presented based on a source of the offer to a viewing user;
   receiving, from a plurality of users of the social networking system, a plurality of actions with digital content that includes the offer;
   determining, based on the actions, a content item for display to a viewing user of the social networking system, the content item containing the offer;
   determining a source of the content item that contains the offer, the source determined from the action on which the content item is based;
   selecting, by a computer processor, a first whisper code from the plurality of whisper codes, the selecting based on applying the set of rules to the determined source of the content item;
   generating a page of content including the content item that contains the offer and the selected whisper code in connection with the content item;
   sending the page of content for display to the viewing user.

2. The method of claim 1, wherein the set of rules determine the whisper code based at least in part on a time associated when the offer is presented.

3. The method of claim 1, wherein the source of the offer comprises at least one of a source type of the offer, a communication channel type of the social networking system in which the offer is presented, and a degree of separation of the viewing user from the source another user who posted the offer.

4. The method of claim 1, further comprising:
   receiving redemption information when the viewing user redeems the offer at the merchant establishment.

5. The method of claim 1, further comprising:
   logging information about offer impressions based on the selected whisper code;
   aggregating the logged information; and
   sending the aggregated information to a merchant.

6. A method comprising:
   receiving from an advertiser at a social networking system an offer for redemption at a merchant establishment associated with the advertiser;
   receiving a set of rules for selecting a whisper code from a plurality of whisper codes to be presented with the offer, the rules determining the whisper code to be presented based on a source of the offer to a viewing user;
   receiving, from a plurality of users of the social networking system, a plurality of actions with digital content that includes the offer;
   determining, based on the actions, a content item for display to a viewing user of the social networking system, the content item containing the offer;
   determining a source of the content item that contains the offer, the source determined from the action on which the content item is based;
   selecting, by a computer processor, a first whisper code from the plurality of whisper codes, the selecting based on applying the set of rules to the determined source of the content item;
   generating a page of content including the content item that contains the offer and the selected first whisper code in connection with the content item;
   sending the page of content for display to the viewing user;
   receiving information regarding redemption of the offer at the merchant establishment by the viewing user of the social networking system, the received information comprising the selected whisper code associated with the redemption; and
   computing one or metrics based on the received information regarding the redemption.

7. The method of claim 6, wherein the set of rules determine the whisper code based at least in part on a time associated with when the offer is presented.

8. The method of claim 6, wherein the set of rules determine the whisper code based at least in part on social data associated with the viewing user when the offer is presented.

9. The method of claim 8, wherein the social data specifies whether the viewing user's friends have seen or redeemed the offer.

10. The method of claim 6, wherein the source of the offer comprises at least one of a source type of the offer, a communication channel type of the social networking system in which the offer is presented, and a type or a depth of offer distribution when the offer is presented.

11. The method of claim 6, wherein the received information regarding the redemption includes impressions per whisper code.

12. The method of claim 6, wherein the one or more metrics comprise in-store conversion rate.

13. The method of claim 6, wherein the one or more metrics comprise at least one of average time to redemption, rate of redemption compared to number of impressions, rate of redemption based on number of impressions received by other social networking users connected to the viewing user.

14. The method of claim 6, wherein the one or more metrics comprise rate of redemption based on depth of share.

15. The method of claim 6, further comprising providing a user interface to the advertiser to view metrics, or otherwise sending the metrics for display to the advertiser.

16. The method of claim 6, further comprising providing a user interface to a merchant to view metrics, or otherwise sending the metrics for display to the merchant.

17. A method comprising:
receiving from an advertiser at a social networking system an offer for redemption at a merchant establishment associated with the advertiser;
receiving a first set of rules selecting a whisper code from a plurality of whisper codes to be presented with the offer, the first set of rules determining the whisper code to be presented based on a source of the offer to a viewing user;
receiving a second set of rules for modifying the offer based on the whisper code;
receiving, from a plurality of users of the social networking system, a plurality of actions with digital content that includes the offer;
determining, based on the actions, a first content item for display to a first viewing user of the social networking system and a second content item for display to a second viewing user, the first content item and the second content item containing the offer;
determining a first source of the first content item that contains the offer and a second source of the second content item that contains to offer, the first source determined from the action on which the first content item is based and the second source determined from the action on which the second content item is based;
selecting, by a computer processor, a first whisper code and a second whisper code from the plurality of whisper codes, the selecting based on applying the first set of rules to the first source of the first content item and the second source of the second content item;
generating a first page of content including the content item that contains the offer and the first whisper code in connection with the first content item;
sending the first page of content to the first viewing user;
modifying the offer based on the second whisper code, wherein the second whisper code is different from the first whisper code based on the second source being different from the first source;
generating a page of content including the second content item that contains the modified offer and the second whisper code in connection with the second content item; and
sending the second page of content to the second viewing user.

18. The method of claim 17, wherein modifying the offer comprises changing a discount level associated with the offer.

19. The method of claim 1, wherein the first source is an advertisement, and the second source is a story about an interaction between one or more friends of the second viewing user and the offer.

20. The method of claim 6, wherein the first source is an advertisement, and the second source is a story about an interaction between one or more friends of the second viewing user and the offer.

21. The method of claim 17, wherein the first source is an advertisement, and the second source is a story about an interaction between one or more friends of the second viewing user and the offer.

22. The method of claim 1, wherein the source comprises a post from a user connected to the viewing user.

23. The method of claim 1, wherein the source comprises a story about an action of a user connected to the viewing user.

24. The method of claim 1, wherein the source comprises a story included in a newsfeed.

25. The method of claim 1, wherein the source comprises a post from a page associated with a third party external to the social networking system.

26. The method of claim 1, wherein the source comprises an advertisement.

27. The method of claim 1, wherein the plurality of actions is selected from a group consisting of posting the offer, sharing the offer, accepting the offer, or otherwise interacting with a post containing the offer.

28. The method of claim 6, wherein the plurality of actions is selected from a group consisting of posting the offer, sharing the offer, accepting the offer, or otherwise interacting with a post containing the offer.

29. The method of claim 17, wherein the plurality of actions is selected from a group consisting of posting the offer, sharing the offer, accepting the offer, or otherwise interacting with a post containing the offer.

* * * * *

UNITED STATES PATENT AND TRADEMARK OFFICE
CERTIFICATE OF CORRECTION

PATENT NO. : 10,255,616 B2
APPLICATION NO. : 13/398714
DATED : April 9, 2019
INVENTOR(S) : Bruich et al.

Page 1 of 1

It is certified that error appears in the above-identified patent and that said Letters Patent is hereby corrected as shown below:

In the Claims

In Column no: 18, Line(s) no: 35, Claim 2, delete "one or" and insert -- one or more --

Signed and Sealed this
Thirtieth Day of July, 2019

Andrei Iancu
*Director of the United States Patent and Trademark Office*